United States Patent
Cai et al.

(10) Patent No.: US 8,139,735 B2
(45) Date of Patent: Mar. 20, 2012

(54) IMS GATEWAY SYSTEMS AND METHODS

(75) Inventors: Yigang Cai, Naperville, IL (US); Sheng Chen, Beijing (CN); Qinghong He, Beijing (CN); Ling Jiang, Beijing (CN); Ke Pei, Beijing (CN); Judith A. Stafford, Naperville, IL (US); Jie Su, Beijing (CN); Ya Ping Wu, Beijing (CN); Chao Liang Zhang, Beijing (CN)

(73) Assignee: Alcatel Lucent, Paris (FR)

( * ) Notice: Subject to any disclaimer, the term of this patent is extended or adjusted under 35 U.S.C. 154(b) by 1506 days.

(21) Appl. No.: 11/563,383

(22) Filed: Nov. 27, 2006

(65) Prior Publication Data

US 2007/0280447 A1    Dec. 6, 2007

(30) Foreign Application Priority Data

May 31, 2006 (CN) .......................... 2006 1 0132294

(51) Int. Cl.
*H04M 15/00* (2006.01)
(52) U.S. Cl. .................... 379/114.01; 455/406; 370/352
(58) Field of Classification Search .................. 455/406, 455/405; 370/356, 352; 379/114.28, 114.29, 379/115.01, 114.01, 114.09, 121.01, 121.03, 379/126, 127.03, 121.04
See application file for complete search history.

(56) References Cited

U.S. PATENT DOCUMENTS

| | | | |
|---|---|---|---|
| 7,181,193 B2 * | 2/2007 | Ansamaa | 455/406 |
| 7,764,947 B2 * | 7/2010 | Koskinen et al. | 455/405 |
| 7,860,748 B2 * | 12/2010 | Vallinen et al. | 455/405 |
| 7,869,787 B2 * | 1/2011 | Koskinen et al. | 455/406 |
| 7,957,314 B2 * | 6/2011 | Andreasen et al. | 370/252 |
| 8,036,210 B2 * | 10/2011 | Zhu et al. | 370/352 |
| 2008/0311883 A1 * | 12/2008 | Bellora et al. | 455/406 |
| 2011/0207432 A1 * | 8/2011 | Wu | 455/406 |

OTHER PUBLICATIONS

3GPP TS 32.240 V. 6.0.0 (Sep. 2004) 3rd Generation Partnership Project; Technical Specification Group Services and System Aspects; Telecommunication management; Charging management; Charging architecture and principles (Release 6).
3GPP TS 32.299 V. 6.0.0 (Sep. 2004) 3rd Generation Partnership Project; Technical Specification Group Services and System Aspects; Telecommunication management; Charging management; Diameter Charging applications (Release 6).

* cited by examiner

*Primary Examiner* — Olisa Anwah
(74) *Attorney, Agent, or Firm* — Duft Bornsen & Fishman LLP

(57) ABSTRACT

IMS gateway systems and methods are disclosed for providing online charging for IMS sessions. An IMS gateway system described herein operates based on a state machine to provide charging triggers and IMS session control. For one charging trigger, the IMS gateway system transmits an initial credit control request message to an online charging system (OCS) responsive to receiving a session initiation message from a first subscriber of a session. For another charging trigger, the IMS gateway system transmits an update credit control request message to the OCS responsive to receiving a session acceptance message from a second subscriber of the session. For another charging trigger, the IMS gateway system transmits a termination credit control request message to the OCS responsive to receiving a session termination message. The IMS gateway system may trigger on other session control messages or charging messages from the OCS to provide online charging.

18 Claims, 6 Drawing Sheets

| | State | Event | Action | New State |
|---|---|---|---|---|
| 1. | Idle | Original INVITE of dialog A received | Send CCR[initial] | Pending |
| 2. | Pending Initial | CCA[Failure] returned Includes: Failure to send, Temporary error (after retrying the alternative server) END_USER_SERVICE_DENIED USER_UNKNOWN DIAMETER_CREDIT_LIMIT_REACHED DIAMETER_RATING_FAILED Tx Expires | Send>200 error message to A | Idle |
| 3. | Pending Initial | CCA[OK] received from OCS | INVITE to dialog B | Trying |
| 4. | Pending Initial | CCA[Free] received from OCS Note: that means CREDIT_CONTROL_NOT_APPLICABLE(4011) received. | | Free Session |
| 5. | Trying | Received 1XX from dialog B | Send 1XX in dialog A | Trying |
| 6. | Trying | Received UPDATE | Send UPDATE | Trying |
| 7. | Trying | UPDATE200OK received | Send UPDATE200OK | Trying |
| 8. | Trying | PRACK received from dialog A | Send PRACK in dialog B | Trying |
| 9. | Trying | PRACK200 received from B | Send PRACK200 to A | Trying |
| 10. | Trying | INVITE200OK received from B | Send CCR[UPDATE] to OCS; Send INVITE200OK to A | Pending Update |
| 11. | Trying | CANCEL received from A | Send CANCEL to B | Pending Termination |
| 12. | Pending Termination | 487 received from B | Send 487 to A; Send CCR[Termination]; Release Call | |
| 13. | In Session | INFO received | Send INFO | In Session |
| 14. | In Session | BYE received | Send BYE to another leg Send CCR[Termination] | Pending Termination |
| 15. | In Session | ASR Received from OCS | Send BYE; Send ASA; Send CCR[Termination] | Pending Termination |
| 16. | In Session | Session Time out | Send BYE; Send CCR[Termination] | Pending Termination |

FIG. 6

|  | State | Event | Action | New State |
|---|---|---|---|---|
| 17. | In Session | RAR received from OCS | Send RAA; Send CCR[UPDATE] | Pending Update |
| 18. | In Session | $T_Q$ expire (no Final Unit Indication) | Send CCR[UPDATE] | Pending Update |
| 19. | In Session | $T_Q$ expire (Final Unit Indication) | Send CCR[Termination] | Pending Termination |
| 20. | Free Session | BYE received | Send BYE Release Call | Idle |
| 21. | Free Session | SIP message Recv(INFO or UPDATE etc) | SIP message forward | Free Session |
| 22. | Free Session | Session Time out | Send BYE; Release Call | Idle |
| 23. | Pending Update | BYE received | Queue Event | Pending Update |
| 24. | Pending Update | Session Time out | Queue Event | Pending Update |
| 25. | Pending Update | RAR received | Send RAA | Pending Update |
| 26. | Pending Update | SIP message received(INFO or UPDATE etc) | SIP message forward | Pending Update |
| 27. | Pending Update | CCA[failure] occurs Include: Failure to send Tx expires END_USER_SERVICE_DENIED DIAMETER_RATING_FAILED DIAMETER_CREDIT_LIMIT_REACHED | Send BYE | Idle |
| 28. | Pending Update | CCA[UPDATE OK] received | Start $T_Q$ based on Granted Quota | In Session |
| 29. | Pending Update | CCA[FreeCall] received from OCS Note: that means CREDIT_CONTROL_NOT_APPLICABLE received from OCS |  | Free Session |
| 30. | Pending Update | CCA[Termination] received or Failure to send, temporary error, or failed answer or Tx expired | Release Session | Idle |
| 31. | Trying | SIP 3xx/4xx/5xx/6xx error response received | send >200 to A; send CCR[termination] | Pending Termination |
| 32. | Trying | RAR received | Send RAA | Trying |
| 33. | Trying | ASR received | Send ASA Send CCR[termination] | Pending Termination |
| 34. | Pending Update | ASR received | Queue Event | Pending Update |
| 35. | In Session | UPDATE 200OK received(media change) | Send CCR[UPDATE] Forwarding UPDATE200OK | Pending Update |
| 36. | Pending Update | UPDATE 200OK received (media change) | Queue Event Forwarding UPDATE200OK | Pending Update |

IMS GATEWAY SYSTEMS AND METHODS

RELATED APPLICATIONS

This patent application claims priority to a foreign patent application filed in the Chinese Patent Office, having the application number 200610132294.9 and filed on May 31, 2006.

BACKGROUND OF THE INVENTION

1. Field of the Invention

The invention is related to the field of communications, and in particular, to IMS gateway systems and methods of operating IMS gateway systems.

2. Statement of the Problem

As set forth in the $3^{rd}$ Generation Partnership Project (3GPP), an IP Multimedia Subsystem (IMS) provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

On the IMS platform, the traditional supplementary services, such as call forwarding, conferencing, and call waiting are available for IMS subscribers. Also, many new data services, such as instant messaging, video calls, video on wait, and web-based services, will also be available for the IMS subscribers.

Providing efficient IMS online charging for operator revenue generation is important to the successful deployment of IMS networks. Several 3GPP technical specifications describe online charging for IMS networks. For instance, the 3GPP TS 32.200 specification describes an online charging system (OCS) having a session-based charging function. The OCS is coupled to a serving-call session control function (S-CSCF) through an IMS service control (ISC) interface. The S-CSCF controls a call session for a calling party or a called party and communicates with the OCS over the ISC interface to provide online charging for the call session. However, an ISC interface is a service interface that does not support online charging. Therefore, in order to use the ISC interface between the S-CSCF and the OCS for online charging, additional functionality would unfortunately need to be added to the OCS.

To avoid overloading the OCS with additional functionality and to keep the online charging architecture consistent, the interface between the S-CSCF and the OCS may be changed to support online charging instead of adding functionality to the OCS. One option for an interface that supports online charging is to extend the ISC interface to allow for charging mechanisms. The ISC interface would then be both a service interface and a charging interface. Unfortunately, using the ISC interface as a hybrid service/charging interface may not be acceptable for standardization desired by the 3GPP.

Another option is to use the Ro interface instead of the ISC interface because the Ro interface already supports online charging. The 3GPP TS 32.296 specification suggests using the Ro interface for online charging by introducing an IMS gateway function that acts as a gateway between the S-CSCF and the OCS.

FIG. 1 illustrates an IMS online charging architecture 100 as suggested by the 3GPP in the prior art. Online charging architecture 100 is described in 3GPP TS 32.240 and 32.260. Online charging architecture 100 includes IMS gateway function 102, an S-CSCF 104, and an OCS 106. OCS 106 includes a session-based charging function (SBCF) and an event-based charging function (EBCF). The session-based charging function is responsible for online charging of network/subscriber sessions, such as voice calls or IMS sessions. The event-based charging function performs event-based online charging (also referred to as "context charging") in conjunction with any application servers.

IMS gateway function 102 communicates with S-CSCF 104 over the ISC interface 105 and communicates with OCS 106 over the Ro interface 107. For online charging communication between S-CSCF 104 and the session-based charging function in OCS 106, S-CSCF 104 does not trigger online charging events and thus does not include a Charging Trigger Function (CTF). Instead, the ISC interface 105 is employed by the S-CSCF 104, implying that online charging is transparent to S-CSCF 104 and appears like any other service controlled by a SIP application server. Therefore, if support for Ro-based online charging is required, a special CTF is needed in order to mediate between the Ro-based session-based charging function and the SIP-based service control. This role is taken by IMS gateway function 102, which translates between SIP session control towards S-CSCF 104 and the Ro credit control towards OCS 106.

Unfortunately, the 3GPP specifications do not describe how to use the IMS gateway function for online charging. The specifications also do not resolve how the ISC interface, the Ro interface, and the S-CSCF would function together, and how the IMS gateway function would operate to provide budget control for online charging.

SUMMARY OF THE SOLUTION

The invention solves the above and other related problems with IMS gateway systems and methods of operating IMS gateway systems to provide session control and budget control for an IMS session. State machines are described herein to provide for online charging control for an IMS session. Such implementations of the IMS gateway system have not previously been disclosed or provided.

One embodiment of the invention comprises an IMS gateway system of an IMS network that handles online charging during an IMS session. The IMS gateway system includes a session control interface for communicating with a serving-call session control function (S-CSCF), a control system, and a charging interface for communicating with an online charging system (OCS). When in operation, such as according to a state machine, the control system waits for a session initiation message (e.g., a SIP INVITE message). Responsive to receiving a session initiation message from a first subscriber to initiate a session with a second subscriber through the session control interface, the control system transmits an initial credit control request message (e.g., a Diameter Ro CCR message) through the charging interface to the OCS to initiate a charging session for the first subscriber with the OCS (which acts as a first trigger function). The control system then waits for an initial credit control answer message (e.g., a Diameter Ro CCA message) from the OCS. Responsive to receiving the initial credit control answer message from the OCS through the charging interface, the control system transmits a session initiation message to the second subscriber through the session control interface, and waits for a session acceptance message (e.g., a SIP message) from the second subscriber.

Responsive to receiving the session acceptance message from the second subscriber, the control system transmits the session acceptance message to the first subscriber through the session control interface. The control system also transmits an update credit control request message through the charging interface to the OCS to obtain a quota for the first subscriber for the session (which acts as another trigger function). The control system waits for an update credit control answer message from the OCS. Responsive to receiving the update credit control answer message from the OCS through the charging interface, the control system identifies a quota granted by the OCS in the update credit control answer message, and provides budget control for the session based on the granted quota.

Responsive to receiving a session termination message, the control system transmits a termination credit control request message through the charging interface to the OCS to report the used portion of the granted quota to the OCS (which acts as another trigger function). The control system then waits for a termination credit control answer message from the OCS. Responsive to receiving the termination credit control answer message from the OCS through the charging interface, the control system terminates the session.

Another embodiment of the invention comprises an associated method of operating an IMS gateway system. The invention may include other exemplary embodiments described below.

DESCRIPTION OF THE DRAWINGS

The same reference number represents the same element on all drawings.

FIGS. 5-6 illustrate a state table illustrating a state machine used to define the operation of an IMS gateway system to provide credit control and SIP message handling in an exemplary embodiment of the invention.

DETAILED DESCRIPTION OF THE INVENTION

FIGS. 2-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
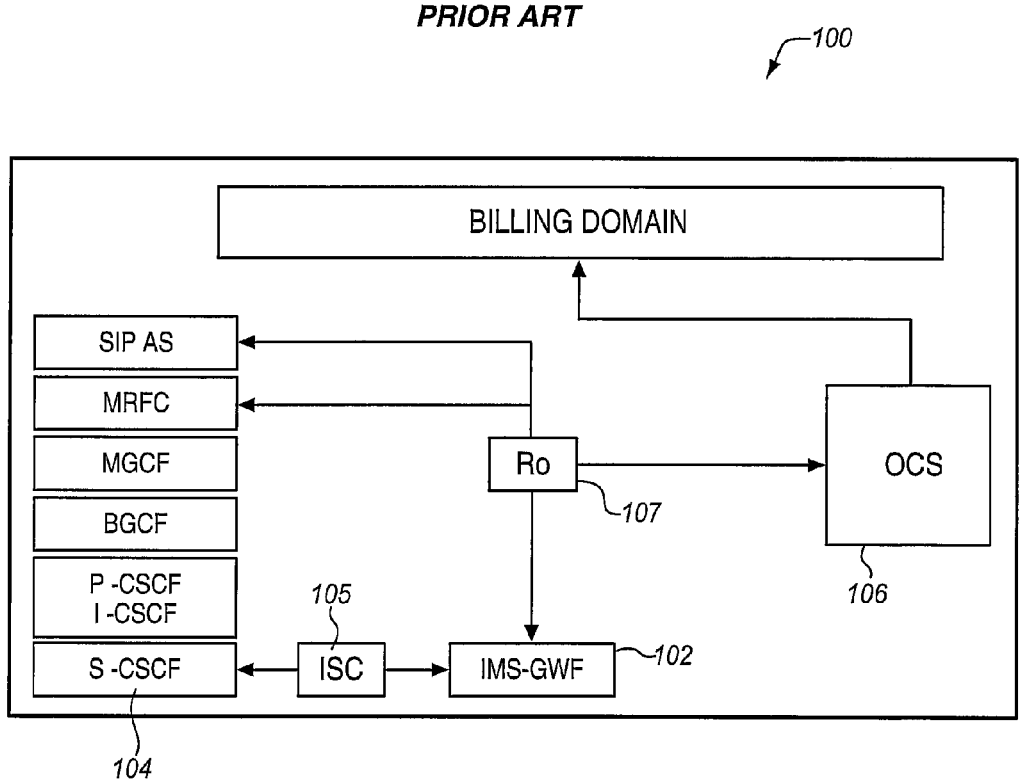
FIG. 1 illustrates the 3GPP online charging architecture including the IMS gateway function in the prior art.
Figure 2:
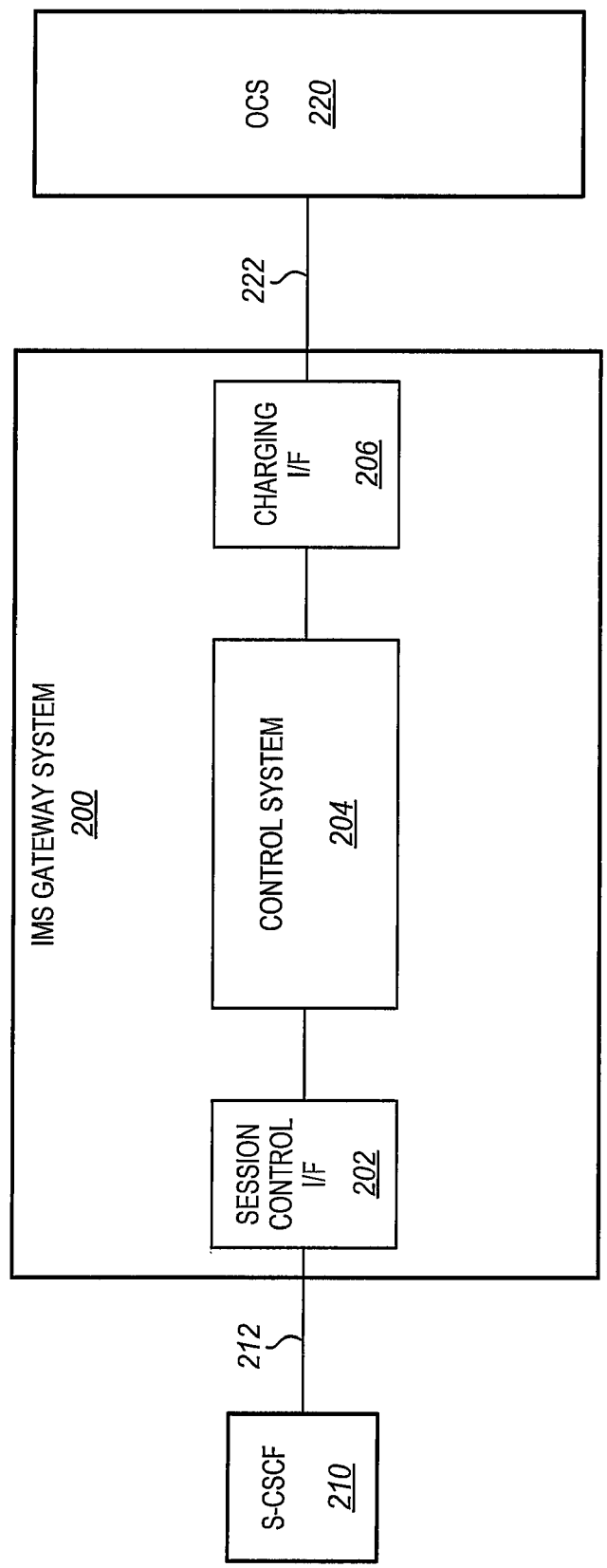
FIG. 2 illustrates an IMS gateway system in an exemplary embodiment of the invention.

FIG. 2 illustrates an IMS gateway system 200 of an IMS network in an exemplary embodiment of the invention. IMS gateway system 200 may be included in the IMS charging architecture 100 of FIG. 1 in a similar manner to IMS gateway function 102, but IMS gateway system 200 may also be implemented in other IMS charging architectures. IMS gateway system 200 includes a session control interface 202, a control system 204, and a charging interface 206. Session control interface 202 is coupled to a serving-call session control function (S-CSCF) 210 over a linr 212. Charging interface 206 is coupled to an online charging system (OCS) 220. over a link 222. IMS gateway system 200 may include other components, devices, or systems not shown in FIG. 2 for the sake of brevity.

Control system 204 comprises any system, device, or server adapted to provide a charging trigger function to perfonn budget control for a session, and adapted to provide session control for the session. Budget control comprises any charging functionality used for charging for a session, such as by communicating with OCS 220. The budget control may be for online charging typically used for prepaid applications. Control system 204 may be implemented as software, hardware, or a combination of hardware and software. In a software implementation, control system 204 may be comprised of instructions that are stored on storage media. The instructions may be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accordance with the invention. The term "processing system" refers to a single processing device or a group of inter-operational processing devices. Some examples of processors are computers, integrated circuits, and logic circuitry. Those skilled in the art are familiar with instructions, processors, and storage media.

Session control interface 202 comprises any interface adapted to transmit/receive session control messages to/from S-CSCF 210. Session control messages comprise any messages used for session start-up, session management or maintenance, or session tear-down. Session control interface 202 may comprise an IMS service control (ISC) interface as suggested by the 3GPP, but may comprise another interface in other embodiments.

Charging interface 206 comprises any interface adapted to transmit/receive charging messages to/from OCS 220. Charging messages comprise any messages used for online charging of sessions in an IMS network. Charging interface 206 may comprise a Diameter Ro interface as suggested by the 3GPP, but may comprise another interface in other embodiments.

Figure 3:
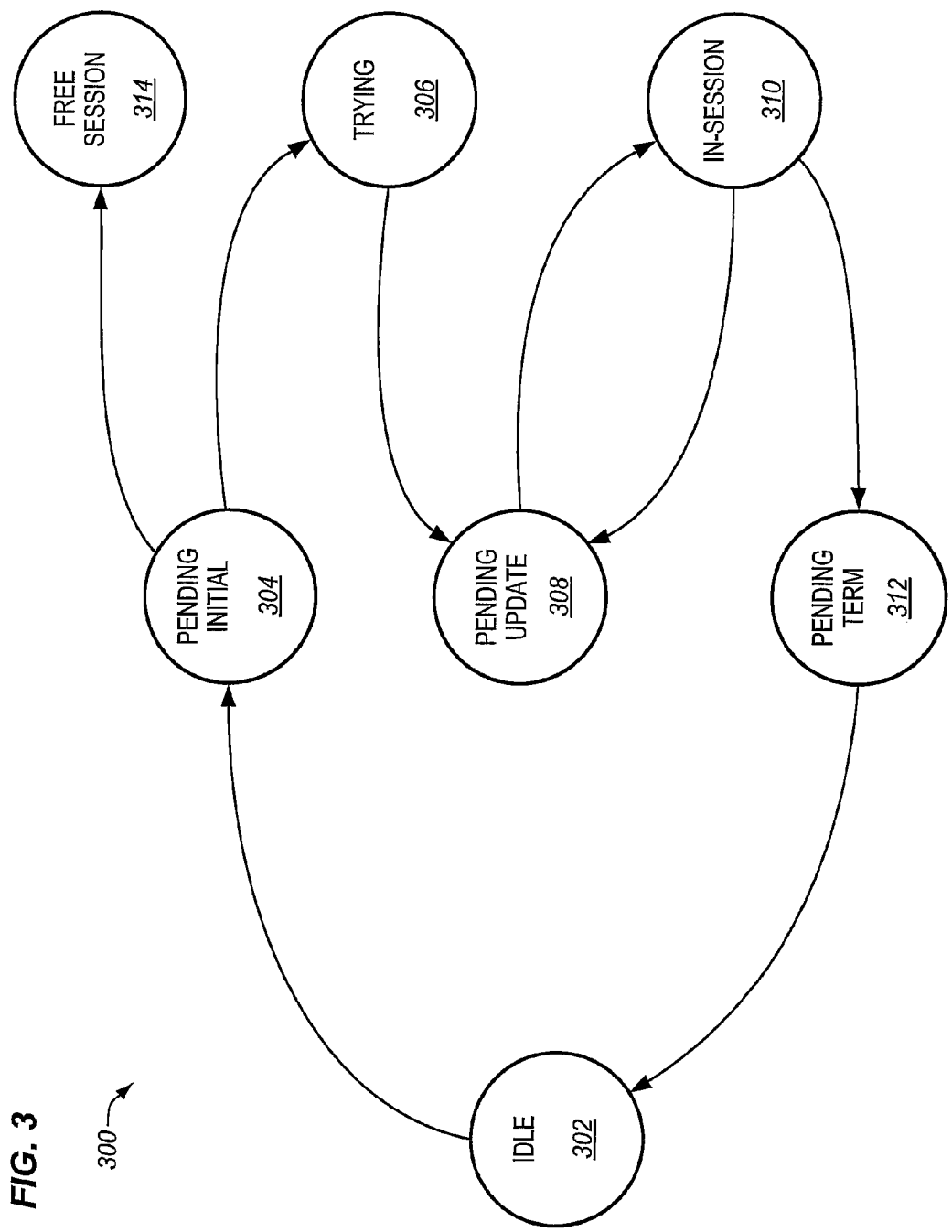
FIG. 3 is a state diagram illustrating an exemplary operation of an IMS gateway system in an exemplary embodiment of the invention.

FIG. 3 is a state diagram 300 illustrating an exemplary operation of IMS gateway system 200 in an exemplary embodiment of the invention. Initially, control system 204 of IMS gateway system 200 is in an idle state 302 as an IMS session is not established. Control system 204 waits in idle state 302 to receive a session initiation message to initiate an IMS session. Assume for example that a first subscriber initiates an IMS session with a second subscriber through S-CSCF 210 as shown in FIG. 2. If control system 204 receives a session initiation message (such as a SIP INVITE message) from the first subscriber, then control system 204 transitions to a pending initial state 304. The pending initial state 304 may represent the initial triggering point for an IMS session.

In the pending initial state 304, control system 204 transmits an initial credit control request message to OCS 220 through charging interface 206 to initiate a charging session for the first subscriber with OCS 220 (see also FIG. 2). As part of initiating a charging session, OCS 220 may authenticate the first subscriber, identify an account (if any) for the subscriber, identify a rating for the session, identify an account balance for the first subscriber, etc. Control system 204 may also identify session description parameters in the session initiation message, and map the session description parameters in the session initiation message to parameters in the initial credit control request message. An exemplary mapping is described later in this description. Control system 204 then waits for an initial credit control answer message from OCS 220. Examples of an initial credit control request message and an initial credit control answer message include a Diameter CCR message and a Diameter CCA message, respectively.

If control system 204 receives an initial credit control answer message from OCS 220 indicating that a charging session may be established for the first subscriber, then control system 204 transitions to a trying state 306. The trying state 306 may represent a session control state used to establish the IMS session between the first subscriber and the second subscriber. In the trying state 306, control system 204 transmits a session initiation message through session control interface 202 to the second subscriber (through S-CSCF 210) to "invite" the second subscriber to join the IMS session. Control system 204 then waits for a session acceptance message from the second subscriber.

If control system 204 receives a session acceptance message from the second subscriber, such as a SIP 200 OK message, then control system 204 may transmit the session acceptance message to the first subscriber (through S-CSCF 210) and exchange other session control messages to set up the IMS session between the first subscriber and the second subscriber. Control system 204 then transitions to a pending update state 308. The pending update state 308 may represent a mid-session triggering point where charging for an IMS session is updated. In the pending update state 308, control system 204 transmits an update credit control request message through charging interface 206 to OCS 220 to obtain a quota for the first subscriber for the IMS session (see also FIG. 2). Control system 204 then waits for an update credit control answer message from OCS 220.

If control system 204 receives an update credit control answer message from OCS 220, then control system 204 transitions to an in-session state 310. The in-session state 310 may represent a session control state and a budget control state. In the in-session state 310, control system 204 identifies a quota granted by OCS 220 in the update credit control answer message. Control system 204 then provides budget control for the session based on the granted quota. During budget control, control system 204 monitors the granted quota during the IMS session and decrements the quota based on usage for the session.

If the granted quota is used up, control system 204 transitions to the pending update state 308 to request a new quota from OCS 220. In the pending update state 308, control system 204 transmits an update credit control request message through charging interface 206 to OCS 220 to obtain a new quota for the first subscriber (see also FIG. 2). Control system 204 then waits for an update credit control answer message from OCS 220. If control system 204 receives an update credit control answer message from OCS 220, then control system 204 transitions back to the in-session state 310 and continues budget control with the new quota.

If control system 204 receives a session termination message from either the first subscriber or the second subscriber (such as a SIP BYE message), then control system 204 transitions to a pending termination state 312. The pending termination state 312 may represent an end-of-session triggering point where charging for an IMS session is reported to OCS 220. For instance, control system 204 may report the unused portion of the granted quota to OCS 220. In the pending termination state 312, control system 204 transmits a termination credit control request message through charging interface 206 to OCS 220 to report the used portion of the granted quota to the OCS 220 (see also FIG. 2). Control system 204 then waits for a termination credit control answer message from OCS 220.

If control system 204 receives a termination credit control answer message from OCS 220, then control system 204 transitions from the pending terminate state 312 to the idle state 302.

State diagram 300 also includes a free session state 314. When control system 204 is in the pending initial state 304, control system 204 waits for an initial credit control answer message from OCS 220. If control system 204 receives the initial credit control answer message indicating that this session is a toll free or no-charge, then control system 204 transitions to the free session state 314. In the free session state 314, control system 204 transmits the appropriate session control messages to establish the session between the first subscriber and the second subscriber, and provides toll free budget control for the session. With toll free budget control, control system 204 does not interface with OCS 220 to charge the first subscriber for the session.

Figure 4:
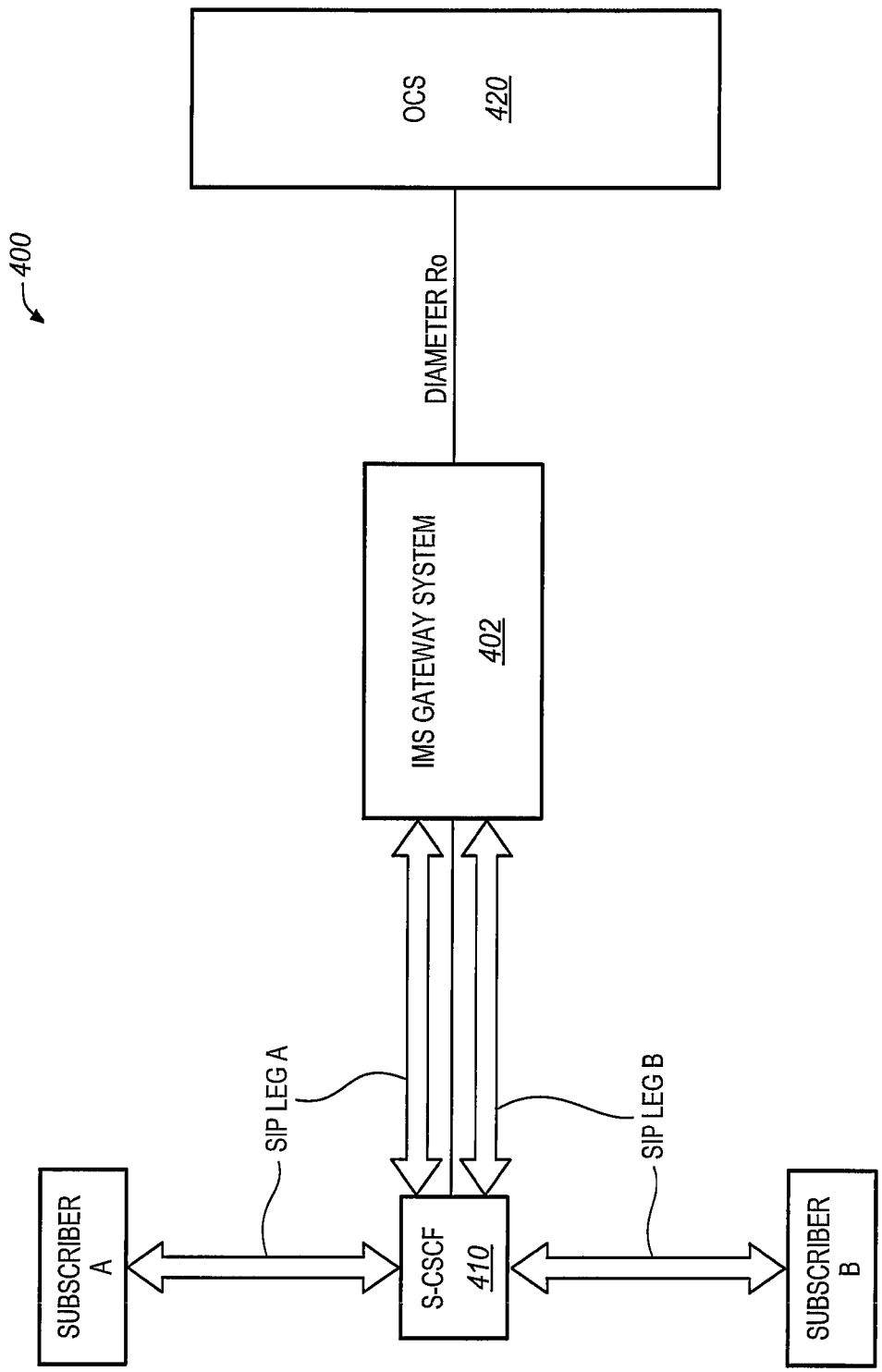
FIG. 4 illustrates another IMS gateway system in an IMS network in an exemplary embodiment of the invention.

FIG. 4 illustrates another IMS gateway system 402 in an IMS network 400 in an exemplary embodiment of the invention. IMS gateway system 402 is coupled to a serving-call session control function (S-CSCF) 410 and an online charging system (OCS) 420. IMS gateway system 402 may include other components, devices, or systems not shown in FIG. 4 for the sake of brevity.

If an IMS session is established in IMS network 400 between subscriber A and subscriber B, then IMS gateway system 402 is adapted to manage a first leg A (or dialog A) of the session with subscriber A. IMS gateway system 402 is also adapted to manage a second leg B (or dialog B) of the session with subscriber B.

IMS gateway system 402 operates at the IMS session layer and performs online charging of IMS sessions. IMS gateway system 402 acts as a SIP application server (AS) and receives the SIP signaling information forwarded by the S-CSCF 410. IMS gateway system 402 is thus able to monitor the SIP signaling communication of all ongoing IMS sessions. Based on the SIP signaling information, IMS gateway system 402 constructs charging requests and sends them to OCS 420. OCS 420 performs the rating and determines whether the user has sufficient credit to setup or change the session. During the session, IMS gateway system 402 periodically verifies with OCS 420 whether the user has sufficient credit to continue the session. When the user runs out of credit, IMS gateway system 402 ends the session.

IMS gateway system 402 behaves as a routing back-to-back user agent for the multiple SIP dialogs as specified in IETF RFC 3261. Because of this continued participation during the dialogs, IMS gateway system 402 may manage each dialog independently (add, remove, or modify). This allows for a greater degree of control such as for managing parties in a credit control (e.g., insufficient balance), as IMS gateway system 402 may release the dialogs directly. IMS gateway system 402 may also contact the Multimedia Resource Function Controller (MRFC) (not shown in FIG. 4 but shown in FIG. 1) via S-CSCF 410, which is one reason that IMS gateway system 402 operates in back-to-back mode.

In this mode of operation, the incoming SIP request is proxied by S-CSCF 410 to IMS gateway system 402. IMS gateway system 402 then generates a new SIP request for a different SIP dialog, and transmits the new SIP request to S-CSCF 410. S-CSCF 410 then proxies the new SIP request towards the destination. When initiating a dialog, IMS gateway system 402 populates the top most route header in the SIP request with the second top most entry based on earlier transactions. IMS network 400 is provisioned such that SIP messages include at least two route headers when requests are sent to an application server. The top route header identifies the application server, and the second top most route header is used to route back to S-CSCF 410. The second Route header is returned unchanged including all parameters.

When receiving a SIP INVITE message, IMS gateway system 402 strips the Contact, Via, and Route headers of the received INVITE when generating a new INVITE for the outgoing dialog. IMS gateway system 402 then populates the Contact header in outgoing INVITE with the URI of IMS gateway system 402.

When IMS gateway system 402 receives an initial request for a dialog (excluding ACK requests and CANCEL requests and responses), IMS gateway system 402 stores the values received in the P-Charging-Vector header (e.g., ICID parameter) and retains the P-Charging-Vector header in the message. IMS gateway system 402 also stores the values received in the P-Charging-Function-Addresses header and retains the P-Charging-Function-Addresses header in the message. When IMS gateway system 402 sends any request or response related to a dialog or standalone transaction, IMS gateway system 402 may copy previously saved values into the P-Charging-Vector and P-Charging-Function-Addresses headers before sending the message.

IMS gateway system 402 internally maps the message headers between the two dialogs that it manages. It is responsible for correlating the dialog identifiers and will decide when to simply translate a message from one dialog to the other, or when to perform credit control functions.

IMS gateway system 402 also determines the direction of a call (i.e., whether the session is originating or terminating). According to features and aspects herein, two IFCs are defined in S-CSCF 410. The two IFCs create distinct CTF names or ports for originating and terminating requests. For example, an exemplary IFC1 for originating requests and an exemplary IFC2 for terminating requests may be:

IFC1—Trigger Point ((method=INVITE) and (session case=ORIGINATING)), where AS name=<sip:ctf@host; orig>; and IFC2—Trigger Point ((method=INVITE) and (session case=TERMINATING)), wherein AS name=<sip:ctf@host; term>.

In another example, exemplary CTF names for originating and terminating requests may be <sip:as1_orig@home.net>and <SIP:as1_term@home.net>, where a parameter in the AS name is used to distinguish originating versus terminating. In another example, exemplary CTF names for originating and terminating requests may be <sip:as1@home.net;orig>and <sip:as1@home.net; term>, where different ports in the AS names are used to distinguish originating versus terminating.

Upon receipt of an initial INVITE from S-CSCF 410, IMS gateway system 402 checks the top most entry of the Route header of the incoming INVITE message. The Route header should include an AS URI(CTF). IMS gateway system 402 then checks the port parameter of the AS. If the port parameter is "orig", then the incoming request should be considered as an outgoing call and the role of node AVP should be set to "originating" when transmitting the CCR to OCS 420 for this session. If the port parameter is "term", then the incoming request should be considered as an incoming call and the role of node AVP should be set to "terminating" when transmitting the CCR to OCS 420 for this session.

IMS gateway system 402 also inspects the media resources to be subsidized. IMS gateway system 402 generates a charging request message (e.g., Diameter Ro CCR message) that includes the media identified in the final SDP negotiated between the user equipment of subscriber A and subscriber B. IMS gateway system 402 maps parameters in the session control message to parameters (AVPs) in the charging request message.

IMS gateway system 402 inspects the SDP content of a SIP INVITE message for media information for the call. The most relevant elements in the SDP are the lines starting with:
"c=" to specify the IP address of the media session in the session description;
"m=" to specify the media type, the port, and the protocol to which the port corresponds (e.g., UDP in the media description); and
"o=" to specify the session version number.

As indicated above, a "c=" line can appear at the session description level, or for individual media streams. If a "c=" line appears with an "m=" line in the media description, then that "c=" line supplies the IP address of that media stream. If an "m=" line appears at the media level without an associated "c=" line, then the session level IP address in the "c=" line of the session description is used for that media stream.

IMS gateway system 402 is adapted to understand the SDP offer/answer mode. IMS gateway system 402 is able to identify the SDP content, and also know which is subscriber A SDP and which is subscriber B SDP. The following table comprises a list of offers and answers that may occur during the initial session setup and dialog confirmation process that IMS gateway system 402 supports.

| Offering Party | Offer | Answering Party | Answer |
|---|---|---|---|
| A | Initial INVITE(offer SDP) | B | 200 OK (INVITE, answer SDP) |
| A | Initial INVITE(offer SDP) | B | 18x (INVITE, answer SDP) |
| A | Initial INVITE(offer SDP) | B | 3xx, 4xx, 5xx, 6xx (INVITE, failure or rejection) |
| B | 200 OK (INVITE, offer SDP) [following initial INVITE with no SDP] | A | ACK (answer SDP) |
| B | 18x (INVITE, offer SDP) [following initial INVITE with no SDP for reliable transfer] | A | PRACK (answer SDP) |
| A | PRACK(offer SDP) | B | 200 OK (PRACK, answer SDP) |
| A | PRACK(offer SDP) | B | 3xx, 4xx, 5xx, 6xx (INVITE, failure or rejection) |
| A/B | UPDATE (offer SDP) | B/A | 200 OK (UPDATE, answer SDP) |
| A/B | UPDATE (offer SDP) | B/A | 3xx, 4xx, 5xx, 6xx (UPDATE, failure or rejection) |

For an outgoing call, the SDP session information may be achieved from subscriber A's latest confirmed SDP (the confirmed SDP means the SDP that has completed the offer/answer negotiation). For an incoming call, the SDP session information may be achieved from subscriber B's latest confirmed SDP. When sending an outgoing INVITE message for the outgoing call leg, IMS gateway system 402 copies the SDP payload of the incoming INVITE request to the SDP payload of the outgoing INVITE message.

IMS gateway system 402 also constructs the CCR messages to OCS 420 using the latest SDP offer and the latest SDP answer. To construct a CCR message, IMS gateway system 402 may use the SDP information to populate at least the SDP Session Description AVP and the SDP Media Component AVP of the CCR message. The SDP Session Description AVP includes one line of SDP session description. Each SDP Media Component AVP includes information for one SDP media component. For an SDP Media Component AVP, IMS gateway system 402 populates the SDP Media Name subfield with contents from m= line. IMS gateway system 402 also populates the GPRS Charging ID subfield with the GPRS charging ID if one exists for this media component. IMS gateway system 402 also populates the SDP Media Description subfield with the contents of the SDP media description.

FIGS. 5-6 illustrate a state table 500 illustrating a state machine used to define the operation of IMS gateway system 402 to provide credit control and SIP message handling in an exemplary embodiment of the invention. State table 500 describes an idle state, a pending initial state, a trying state, a pending update state, an in-session state, a pending termination state, and a free call state of the state machine. The first column of FIGS. 5-6 identifies a row number for the following discussion. The second column of FIGS. 5-6 identifies the states of the state machine. The third column of FIGS. 5-6 identifies events occurring during a session. The fourth column of FIGS. 5-6 identifies an action or actions performed by IMS gateway system 402. The fifth column of FIGS. 5-6 identifies the transitions between states of the state machine.

In the idle state (see row 1 of FIG. 5), IMS gateway system 402 waits for a SIP INVITE message to initiate a session between subscriber A and subscriber B (see FIG. 4). If IMS gateway system 402 receives an initial INVITE message from S-CSCF 410, then IMS gateway system 402 transitions from the idle state to the pending initial state. IMS gateway system 402 then checks whether the INVITE message includes a P-Charging-Vector Header. If no P-Charging-Vector Header is included, then IMS gateway system 402 rejects the INVITE message and responds with a 421 Extension Required message. IMS gateway system 402 also checks whether the INVITE message includes a P-Asserted-ID Header. If no P-Asserted-ID is included, then IMS gateway system 402 rejects the INVITE and responds with a 421 Extension Required message. IMS gateway system 402 also determines the call type based the initial INVITE route header tag. If there is no original parameter of the top-most entry of the SIP route header, then IMS gateway system 402 rejects the INVITE and responds with a 421 Extension Required message. IMS gateway system 402 also checks whether the route header tag of the initial INVITE message includes an <original dialog identifier>at the S-CSCF URI. If the tag does not include this parameter, then IMS gateway system 402 rejects the INVITE and responds with a 421 Extension Required message.

If IMS gateway system 402 receives a valid INVITE message, then IMS gateway system 402 collects SIP charging related headers (P-charging-Vector and P-charging-function address) and SDP information from the INVITE message. IMS gateway system 402 stores the "SIP request timestamp" for later sending within a CCR message. IMS gateway system 402 constructs a Diameter Ro CCR[initial] message from the information taken from the INVITE message. When IMS gateway system 402 collects SDP information from the INVITE message, there is only SDP information for subscriber A in the initial INVITE. IMS gateway system 402 constructs the CCR message based on the SDP information for subscriber A. The CCR[initial] message includes the following parameters populated as follows:

CC-Request-Type: INITIAL_REQUEST
Event Type:
SIP Method: INVITE
Event: not required
Content-type: from INVITE
Content-length: from INVITE
Content-disposition: from INVITE
Calling Party Address: P-Asserted-Identity header of INVITE
Called Party Address: Request URI from the INVITE
IMS Charging Identifier: P-Charging-Vector header from the INVITE IMS gateway system 402 then transmits the CCR[initial] message to OCS 420 (see also FIG. 4), and waits for a CCA [initial] message from OCS 420. The CCR[initial] message is used to determine if subscriber A has sufficient credit to offer the call to subscriber B. IMS gateway system 402 starts a timer (Tx) after transmitting the CCR[initial] message to control the waiting time for a CCA[initial] message. The Tx timer is configurable by IMS gateway system 402, and may be initially set to a time of 10 seconds or something similar. If a failure occurs for the first CCR[initial] message to the primary OCS 420, then IMS gateway system 402 moves the credit control message stream to the backup OCS (not shown in FIG. 4).

In the pending initial state (see row 2 of FIG. 5), if an error occurs with the CCA message, then IMS gateway system 402 transmits the appropriate error response message (i.e., a 3XX/4XX/5XX message) to subscriber A. For instance, IMS gateway system 402 may receive a CCA[failure] message, such as a "failure to send" or a "temporary error" message. A "failure to send" means that the Diameter credit-control client is unable to communicate with the desired destination or alternative destination. This could be due to the peer being down, or due to a physical link failure in the path to or from the credit-control server. For this kind of error received, IMS gateway system 402 transmits a 500 Server Internal Error to the initial leg A (for subscriber A). IMS gateway system 402 may also receive a "temporary error" (after retrying the alternative server). "Temporary error" means that the Diameter credit-control client received a protocol error notification (DIAMETER_TOO_BUSY, DIAMETER_UNABLE_TO_DELIVER or DIAMETER_LOOP_DETECTED) in the Result-Code AVP of the CCA message. The above protocol error notification may ultimately be received in response to the re-transmitted request to a defined alternative destination. IMS gateway system 402 may alternatively receive a Transient Failures code (except 4011) from OCS 420, or a Permanent Failures code from OCS 420. If IMS gateway system 402 receives a CCA (DIAMETER_END_USER_SERVICE_DENIED) from OCS 420, then IMS gateway system 402 transmits a 503 Service Unavailable message to initial leg A. If IMS gateway system 402 receives a CCA (DIAMETER_CREDIT_LIMIT REACHED) from OCS 420, then IMS gateway system 402 transmits a 402 Payment Required message to initial leg A.

If IMS gateway system 402 receives a DIAMETER_USER_UNKNOWN message from OCS 420 (where the specified end user is unknown in the credit-control server), then IMS gateway system 402 transmits a 503 Service Unavailable message to initial leg A. If IMS gateway system 402 receives a DIAMETER_RATING_FAILED message from OCS 420 (which means the credit-control server cannot rate the service request due to insufficient rating input, an incorrect AVP combination, an AVP, or an AVP value that is not recognized or supported in the rating), then IMS gateway system 402 transmits a 503 Service Unavailable message to initial leg A.

If the Tx timer expires, then IMS gateway system 402 may transmit a 503 Service Unavailable message to initial leg A. IMS gateway system 402 then transitions from the pending initial state back to the idle state.

In the pending initial state (see row 3 of FIG. 5), if IMS gateway system 402 receives a valid CCA[initial] message from OCS 420, then IMS gateway system 402 stops the Tx timer. If the CCA[initial] message includes an initial granted quota from OCS 420, the IMS gateway system 402 stores the granted quota. If the CCA[initial] message indicates that a charging session has been established for subscriber A (i.e., subscriber A has sufficient credit for the call session), then IMS gateway system 402 transitions from the pending initial state to the trying state in the state machine. If the CCA [initial] message indicates that this call session is toll free for subscriber A (e.g., a CCA[CREDIT_CONTROL_NOT_APPLICABLE] message) (see row 4 of FIG. 5), then IMS gateway system 402 transitions from the pending initial state to the free call state in the state machine.

In the free call state, IMS gateway system 402 does not need to perform credit control for subscriber A. As such, IMS gateway system 402 does not need to collect charging information and SDP information for subscriber A. However, IMS gateway system 402 does still manage session control and SIP dialogs in the free call state.

In the trying state, IMS gateway system 402 provides session control to establish the session. IMS gateway system 402 transmits a new INVITE message to S-CSCF 410 to establish a new dialog with subscriber B. If IMS gateway system 402 receives a SIP 1XX message from S-CSCF 410 for subscriber B (see row 5 of FIG. 5), then IMS gateway system 402 transmits a 1XX message to the incoming leg A. The message header and SDP information is the same as received in the 1XX message from subscriber B except for the Contact, Via, Route, and Record Route headers. The P-Charging-Vector header and SDP information is also preserved. IMS gateway system 402 also stores the SDP information (if present) from 1XX message from subscriber B (SDP B information). IMS gateway system 402 may need the SDP B information to construct other CCR request AVPs for the incoming call in case there is no other SDP negotiation procedure before transmitting the CCR.

The information in P-Charging-Vector header of 1xx message may not be the same as the previous collected P-Charging-Vector header from the INVITE message. IMS gateway system 402 stores the P-Charging-Vector headers for later use.

IMS gateway system 402 also waits in the trying state for the response to the initial INVITE message from subscriber B. If IMS gateway system 402 receives a SIP UPDATE request over one leg of the session (see row 6 of FIG. 5), then IMS gateway system 402 transmits a corresponding UPDATE request to the other leg of the session. The message header and SDP information for the UPDATE request transmitted by IMS gateway system 402 is the same as for the UPDATE request received by IMS gateway system 402 except for some state information for dialog. IMS gateway system 402 preserves the SDP information from the UPDATE request to construct the next CCR if there is no other SDP negotiation procedure before transmitting the CCR to OCS 420.

The information in P-Charging-Vector header of the UPDATE request may not be the same as the previous collected P-Charging-Vector headers, such as from an INVITE message or 1xx message. IMS gateway system 402 is able to store the P-Charging-Vector headers from the different messages.

In the trying state (see row 7 of FIG. 5), if IMS gateway system 402 receives a SIP UPDATE 200 OK response over one leg of the session, then IMS gateway system 402 transmits a corresponding UPDATE 200 OK response to the other leg of the session. The message header and SDP information for the UPDATE 200 OK response transmitted by IMS gateway system 402 is the same as for the UPDATE 200 OK response received by IMS gateway system 402 except for some state information for dialog. IMS gateway system 402 preserves the SDP information from the UPDATE 200 OK response to construct the next CCR if there is no other SDP negotiation procedure before transmitting the CCR to OCS 420. IMS gateway system 402 may also store the P-Charging-Vector header of the UPDATE 200 OK response.

In the trying state (see row 8 of FIG. 5), if IMS gateway system 402 receives a SIP PRACK request over one leg of the session, then IMS gateway system 402 transmits a corresponding PRACK request to the other leg of the session. The message header and SDP information for the PRACK request transmitted by IMS gateway system 402 is the same as for the PRACK request received by IMS gateway system 402 except for some state information for dialog. IMS gateway system 402 may store the SDP information and the P-Charging-Vector header from the PRACK request.

In the trying state (see row 9 of FIG. 5), if IMS gateway system 402 receives a SIP PRACK 200 OK response over one leg of the session, then IMS gateway system 402 transmits a corresponding PRACK 200 OK response to the other leg of the session. The message header and SDP information for the PRACK 200 OK response transmitted by IMS gateway system 402 is the same as for the PRACK 200 OK response received by IMS gateway system 402 except for some state information for dialog. IMS gateway system 402 may store the SDP information and the P-Charging-Vector header from the PRACK 200 OK response.

In the trying state (see row 11 of FIG. 5), if IMS gateway system 402 receives a CANCEL request over one leg of the session, then IMS gateway system 402 transmits a corresponding CANCEL request to the other leg of the session. The message header and SDP information for the CANCEL request transmitted by IMS gateway system 402 is the same as for the CANCEL request received by IMS gateway system 402 except for some state information for dialog. IMS gateway system 402 then transitions from the trying state to the pending termination state, in which IMS gateway system 402 waits for a CANCEL response.

In the trying state (see row 10 of FIG. 5), if IMS gateway system 402 receives a SIP INVITE 200 OK response over one leg of the session, then IMS gateway system 402 transmits a corresponding INVITE 200 OK response to the other leg of the session. The message header and SDP information for the INVITE 200 OK response transmitted by IMS gateway system 402 is the same as for the INVITE 200 OK response received by IMS gateway system 402 except for some state information for dialog. IMS gateway system 402 may store the SDP information and the P-Charging-Vector header from the INVITE 200 OK response. IMS gateway system 402 also stores a "SIP response" timestamp for later sending within a CCR message. IMS gateway system 402 then transitions from the trying state to the pending update state.

The receipt of the INVITE 200 OK is a triggering point for charging in the pending update state. Thus, IMS gateway system 402 constructs a CCR[update] message from the information taken from the INVITE 200 OK message. When IMS gateway system 402 collects SDP information from the INVITE 200 OK message, there is SDP information for subscriber A and subscriber B. IMS gateway system 402 constructs the CCR message based on the SDP information for subscriber A and subscriber B. The Used-Service-Unit AVP is set to zero. The CCR[update] message includes other parameters populated as follows:

CC-Request-Type: UPDATE_REQUEST
Event Type:
SIP Method: INVITE
Event: not required
Content-type: from INVITE
Content-length: from INVITE
Content-disposition: from INVITE
Called Party Address: Request URI from the INVITE IMS gateway system 402 then transmits the CCR[update] message to OCS 420 (see also FIG. 4), and waits for a CCA [update] message from OCS 420. The CCR[update] message is used to request a quota from OCS 420 in order to perform budget control for the call session. IMS gateway system 402 starts a timer (Tx) after transmitting the CCR[update] message to control the waiting time for a CCA[update] message.

If IMS gateway system 402 receives a CCA[update] message from OCS 420, then IMS gateway system 402 transitions to the in-session state. IMS gateway system 402 identifies a granted quota in the CCA[update] message, and begins budget control for the session based on the granted quota.

In the in-session state (see row 13 of FIG. 5), the dialog is established and budget control for the session is being performed. If IMS gateway system 402 receives SIP messages that do not involve a charging trigger, such as a SIP INFO message, then IMS gateway system 402 forwards the SIP messages from one leg to another leg without changing the message, except for the Contact, Via, Route, and Record Route headers. Before the dialog is established and responsive to receiving a SIP INFO message or another unrecognized SIP message, IMS gateway system 402 rejects the message and returns with 501 no implementation message.

In the in-session state (see row 14 of FIG. 5), if IMS gateway system 402 receives a SIP BYE message, then IMS gateway system 402 transmits a SIP BYE message to the other leg. IMS gateway system 402 then transitions from the in-session state to the pending termination state.

In the pending termination state, IMS gateway system 402 constructs a CCR[termination] message. The CCR[termination] is constructed based on the collected charging information and the remaining balance for the granted quota. The CCR[termination] message includes the following parameters populated as follows:

CC-Request-Type: TERMINATION_REQUEST
Event Type:
SIP Method: BYE
Event: not required
Content-type: from BYE
Content-length: from BYE
Content-disposition: from BYE
Calling Party Address: P-Asserted-Identity header of INVITE
Called Party Address: Request URI from the INVITE
IMS Charging Identifier: P-Charging-Vector header from the INVITE In the in-session state (see row 15 of FIG. 5), if IMS gateway system 402 receives a Diameter ASR message from OCS 420, then IMS gateway system 402 transmits a BYE message to both dialogs. IMS gateway system 402 then transmits an ASA message to OCS 420. IMS gateway system 402 also transitions from the in-session state to the pending termination state, where IMS gateway system 402 transmits a CCR[termination] message to OCS 420.

In the in-session state (see row 16 of FIG. 5), if IMS gateway system 402 determines that the SIP session has timed out, then IMS gateway system 402 transmits a SIP BYE message to both dialogs. IMS gateway system 402 then transitions from the in-session state to the pending termination state. In the pending termination state, IMS gateway system 402 transmits a CCR[termination] message to OCS 420.

In the in-session state (see row 17 of FIG. 6), if IMS gateway system 402 receives a Diameter RAR request from OCS 420, then IMS gateway system 402 transmits an RAA response to OCS 420. IMS gateway system 402 then transitions from the in-session state to the pending update state. In the pending update state, IMS gateway system 402 transmits a CCR[update] message to OCS 420. IMS gateway system 402 reports the units actually used by sending the CCR[update] message to OCS 420 after transmitting the RAA response.

In the in-session state (see row 18 of FIG. 6), if IMS gateway system 402 receives a Tq expire and there is no Final Unit Indication received in the last CCA, then IMS gateway system 402 transitions from the in-session state to the pending update state. In the pending update state, IMS gateway system 402 transmits a CCR[update] message to OCS 420.

In the in-session state (see row 19 of FIG. 6), if IMS gateway system 402 receives a To expire and there is a Final Unit Indication received in the last CCA, then IMS gateway system 402 transitions from the in-session state to the pending termination state. In the pending termination state, IMS gateway system 402 transmits a CCR[termination] message to OCS 420.

In the free call state (see row 20 of FIG. 6), if IMS gateway system 402 receives a SIP BYE message from any leg, then IMS gateway system 402 transmits a BYE message to the other leg and releases resources of this session.

In the free call state (see row 21 of FIG. 6), if IMS gateway system 402 receives any SIP message, such as an INFO message or an UPDATE message from any leg, then IMS gateway system 402 transmits the SIP message to the other leg.

In the free call state (see row 22 of FIG. 6), if IMS gateway system 402 receives a report that the SIP session timed out, then IMS gateway system 402 transmits a BYE message to both dialogs and releases resources of this session.

In the pending update state (see row 23 of FIG. 6), if IMS gateway system 402 receives a SIP BYE message from S-CSCF 410, then IMS gateway system 402 holds the BYE message in a queue. IMS gateway system 402 stays in the pending update state until receiving a CCA[update] message.

In the pending update state (see row 24 of FIG. 6), if IMS gateway system 402 receives a report that the SIP session timed out, then IMS gateway system 402 holds the report in a queue.

In the pending update state (see row 25 of FIG. 6), if IMS gateway system 402 receives a Diameter RAR request, then IMS gateway system 402 transmits an RAA response to OCS 420, but does not need to transmit the CCR[update] to OCS 420.

In the pending update state (see row 26 of FIG. 6), if IMS gateway system 402 receives any SIP message, such as an INFO message or an UPDATE message from any leg, then IMS gateway system 402 transmits the SIP message to the other leg.

In the pending update state (see row 27 of FIG. 6), if IMS gateway system 402 receives a CCA[update failure] message from OCS 420, then IMS gateway system 402 transmits a SIP BYE message to both dialogs. The failure may include a Failure to send, Tx expiring, END_USER_SERVICE_DENIED, DIAMETER_RATING_FAILED, DIAMETER_CREDIT_LIMIT_REACHED, etc. IMS gateway system 402 then transitions to the idle state.

IMS gateway system 402 does not need to support OCS Failover. If a failure occurs during an ongoing credit control session, then IMS gateway system 402 will not move the credit control message to a backup OCS.

In the pending update state (see row 28 of FIG. 6), if IMS gateway system 402 receives a valid CCA[update] message from OCS 420, then IMS gateway system 402 transitions to the in-session state. IMS gateway system 402 may store a Final-Unit-Indication (FUI) from the CCA[update] message. In the in-session state, IMS gateway system 402 identifies a granted quota provided in the CCA[update] message. IMS gateway system 402 then starts a timer Tq based on the granted quota to provide budget control. New granted quotas received in the CCA[update] message may override any remaining quota resources after accounting for any resource usage while the re-authorization was in progress.

In the pending update state (see row 29 of FIG. 6), if IMS gateway system 402 receives a CCA[update] message that indicates that CREDIT_CONTROL-NOT_APPLICABLE for this session, then IMS gateway system 402 transitions to the free call state.

In the pending termination state (see row 30 of FIG. 6), if IMS gateway system 402 receives a CCA[termination] message, a Failure to send, a Temporary error, a failed answer, or a Tx expired, then IMS gateway system 402 releases the call resources and transitions to the Idle state.

In the trying state (see row 31 of FIG. 6), if IMS gateway system 402 receives a SIP 3XX/4XX/5XX/6XX error response, then IMS gateway system 402 transmits a corresponding error response to the incoming dialog. IMS gateway system 402 then transitions to the pending termination state. In the pending termination state, IMS gateway system 402 transmits a CCR[termination] message to OCS 420 to stop the refund of the granted unit. If a SIP dialog terminates abnormally through a 3XX/4XX/5XX/6XX message, then the "Cause Code" sub-field of "Cause" AVP is set.

In the trying state (see row 32 of FIG. 6), if IMS gateway system 402 receives RAR message from OCS 420, then IMS gateway system 402 transmits an RAA message to OCS 420.

In the trying state (see row 33 of FIG. 6), if IMS gateway system 402 receives ASR message from OCS 420, then IMS gateway system 402 transmits an ASA message to OCS 420 with result_code=limited success. IMS gateway system 402 then transitions to the pending termination state. In the pending termination state, IMS gateway system 402 transmits a CCR[termination] message to OCS 420.

In the pending update state (see row 34 of FIG. 6), if IMS gateway system 402 receives an ASR message from OCS 420, then IMS gateway system 402 stores the message in a queue.

In the in-session state (see row 35 of FIG. 6), if IMS gateway system 402 receives a SIP media change message, such as a SIP UPDATE 200 OK message, then IMS gateway system 402 transmits the media change message to the other dialog and stores the media change message in a queue. IMS gateway system 402 then transitions to the pending update state. In the pending update state, IMS gateway system 402 transmits a CCR[update] message to OCS 420.

In the pending update state, if IMS gateway system 402 receives a SIP media change message, such as a SIP UPDATE 200 OK message, then IMS gateway system 402 transmits the media change message to the other dialog and stores the media change message in a queue. IMS gateway system 402 then transitions to the pending update state. In the pending update state, IMS gateway system 402 transmits a CCR[update] message to OCS 420.

In the pending termination state (see row 12 of FIG. 5), if IMS gateway system 402 receives a 487 response, then IMS gateway system 402 transmits the a CCR[termination] message to OCS 420 and waits for the CCA[termination] message.

The state machine illustrated in FIGS. 5-6 is a detailed implementation of IMS gateway system 402. The invention is not limited to the state machine in FIGS. 5-6 as it is one exemplary implementation. Other implementations can be used which are within the scope of the invention.

When IMS gateway system 402 generates a CCR message for the OCS 420 according to the state machine, IMS gateway system 402 maps certain parameters of the SIP messages into the Diameter Ro message AVPs. For instance, one AVP is the Service-Context-Id AVP as defined in IETF RFC 4006 [402]. It is of type UTF8String and contains a unique identifier of the Diameter Credit Control service specific document that applies to the request. This is an identifier allocated by the service provider/operator, by the service element manufacturer, or by a standardization body that uniquely identifies a given Diameter Credit Control service specific document. For IMS charging, the Service-Context-Id AVP should be 6.32260@3gpp.org per the 3GPP standards.

The "SIP-Method" subfield of the "EVENT-TYPE" AVP is set to the name of the SIP Method causing an accounting request to be sent to OCS 420. For a CCR[initial] message, IMS gateway system 402 fills the SIP-Method AVP with "INVITE". For a CCR[update] message, IMS gateway system 402 fills the SIP-Method AVP with "UPDATE" or "INVITE" depending on which message was received. For a CCR[termination] message, IMS gateway system 402 fills the SIP-Method AVP with "BYE" or "CANCEL" depending on which message was received.

The CC-Request-Number AVP (AVP Code 415) is of type Unsigned32 and identifies this request within one session. Session-Id AVPs are globally unique and the combination of Session-Id and CC-Request-Number AVPs is also globally unique and can be used in matching credit-control messages with confirmations. One way to produce unique numbers is to set the value to 0 for a credit-control request of type INITIAL_REQUEST and to set the value to 1 for the first UPDATE_REQUEST, to 2 for the second, and so on until the value for TERMINATION_REQUEST is one more than for the last UPDATE_REQUEST.

The "CONTENT TYPE" subfield of the "EVENT-TYPE" AVP is set by IMS gateway system 402 to the media type of the message body. Examples of media type are application/sdp, text/html, etc. The "CONTENT LENGTH" subfield of the "EVENT-TYPE" AVP is set by IMS gateway system 402 to the size of the message body. The "CONTENT DISPOSITION" sub field of the "EVENT-TYPE" AVP indicates how the message body or a message body part is to be interpreted (e.g., session, render, etc).

The "ROLE of NODE" AVP specifies the role of the IMS node as Originating or Terminating Role. One of the following values is set by IMS gateway system 402 as "0" for an Originating_Role for a call originating from the UE, or as "1"

for a Terminating_Role for a call terminating to the UE (if the call is from then UE, then it will be set as Originating Role and if the call is towards the UE, then it will be set as Terminating Role).

The "USER SESSION ID" AVP is set to the SIP Call ID of inbound dialog. For IMS gateway system 402, there are two legs involved in one session and IMS gateway system 402 sets the SIP CALL ID for the inbound dialog (or call leg). For a SIP session, the Session-ID includes the SIP Call ID as defined in IETF RFC 3261.

The "Calling Party Address" AVP is set to the address of present Calling Party as populated in P-Asserted-Identity Header. An originating IMS gateway system may obtain the Calling-Party-Address AVP content from the P-Asserted-Identity header in the request and the Called-Party-Address AVP from the Request-URI or obtain the Called-Party-Address from the P-Asserted-Identity header of the response. A terminating IMS gateway system could obtain the Calling-Party-Address AVP content from the P-Asserted-Identity header in the request and the Called-Party-Address AVP from the Request-URI or from the P-Called-Party-ID (in case the Request URI is a contact address URI) of the request. The Called-Party-Address may also be obtained from the P-Asserted-Identity header of the response. The format of "Calling Party Address" AVP, the "Called Party Address" AVP are in the form of either a SIP URI or a TEL URL.

The address may be derived from the P-Asserted-Identity header by (DISPLAY Name)+(SIP URI or TEL URL). IMS gateway system 402 populates both AVPs either with the SIP URI or the TEL URL. IMS gateway system 402 may include optional parameters with the SIP URI/TEL URL.

The "Called Party Address" AVP is set to the address of the current called party to whom a session is established as populated in the Request-URI or P-Called-party-ID. The format of this AVP is per requirement IMGW-366.

The "SIP Request Time Stamps" subfield of the "Time Stamps" AVP is set to the time in UTC format of the initial SIP request when received (e.g., INVITE). The "SIP Response Time Stamps" subfield of the "Time Stamps" AVP is set to the time in UTC format of the final response to the initial SIP request when received (e.g., 200 OK, Failure response, etc). When IMS gateway system 402 generates a CCR[termination] message, IMS gateway system 402 includes a SIP Request Time stamp for the SIP BYE/CANCEL message. When IMS gateway system 402 generates a CCR[initial] message, IMS gateway system 402 doesn't populate the "Time Stamps" AVP because IMS gateway system 402 has yet to receive a 200 OK response to the INVITE message. When IMS gateway system 402 generates the CCR[update] message, IMS gateway system 402 may include both timestamps of the INVITE message and the 200 OK message.

The "Originating Inter Operator Identifier" subfield of "Inter Operator Identifier (IOI)" AVP is set to the Inter Operator Identifier for the originating network as generated by S-CSCF 410 in the home network of the originating end user. The Inter Operator Identifier may be available from the P-Charging-vector header.

The "Terminating Inter Operator Identifier" subfield of "Inter Operator Identifier (IOI)" AVP is set to the Inter Operator Identifier for the terminating network as generated by the S-CSCF 410 in the home network of the terminating end user. The Inter Operator Identifier may be available from the P-Charging-vector header.

The "IMS Charging Identifier (ICID)" AVP includes the ICID for IMS gateway system 402. The first subsystem entity involved in a SIP transaction will generate the ICID and include it in the ICID parameter of the P-Charging-Vector header in the SIP request. The ICID parameter is included in any requests that include the P-Charging-Vector header. However, the P-Charging-Vector (and ICID) is not passed to the UE.

The "SDP Session Description" AVP is set to the content of an "attribute-line" (i=, c=, b=, k=, a=, etc) related to a session in the negotiated CODEC SDP data after an SDP answer is received. All the SDP lines (i=, c=, b=, k=, a=, etc) attributes are included in SDP session description AVP. This will allow for the down stream billing system (OCS) to use what it wants. The "SDP Media Name" sub field of the "SDP Media Component" AVP is set to the content of a "m=" line in the negotiated CODEC SDP data after SDP answer is received. The "SDP Media Description" subfield of the "SDP Media Component" AVP is set to the content of an "attribute-line" (i=, c=, b=, k=, a=, etc.) related to a media component in the negotiated CODEC SDP data after an SDP answer is received.

The "GPRS Charging ID" subfield of the "SDP Media Component" AVP is set to the sequence number generated by the GGSN at PDP context activation. It is populated in the P-Charging-Vector header. The "GGSN Address" AVP is set to the IP address of the GGSN that generated the GPRS Charging ID. It is populated in the P-Charging-Vector header. The "UUS Data" AVP is set if User-to-User data is included in the SIP message that triggered the CCR. The CCR is generally triggered by a SIP 200 OK message. If that 200 OK message includes UUSData, then that CCR includes the UUSData. If the original SIP INVITE message includes the UUS Data, but the 200 OK response to that SIP invite does not include UUS data, then that CCR will not contain the UUS-Data AVP.

The "Amount of UUS (User-to-User) Data" subfield of "UUS Data" AVP is set to the amount (in octets) of User-to-User data conveyed in the body of the SIP message with content-disposition header field equal to "render". In general, the message body can be attached to SIP requests and responses. As such, "Content-Disposition: render" could appear in both requests and responses. During processing to setup a dialog, CCR start/interim/stop may all potentially have UUS data. For standalone transactions (e.g., MESSAGE), the CCR event may have UUS data. The Content-Length value may be used to populate the Amount-of-UUS-Data, if present. If not present, then the octet values are calculated by IMS gateway system 402. If there are multipart message bodies present, then each part may have a different Content-Type and Content-Length. IMS gateway system 402 treats multipart bodies as one chunk of UUS-Data, when Content-type: multipart/xxx is present. In this case, IMS gateway system 402 counts the Amount-of-UUS-data for the total of multi-part bodies.

When the Content-Disposition header includes "render", then the Content-Disposition header is present. If the Content-Disposition header is not present, then IMS gateway system 402 checks the Content-type header (per RFC 3261). If the Content-Type header is "application/sdp", then IMS gateway system 402 assumes the Content-Disposition header to be "session". If Content-Type is not "application/sdp", then IMS gateway system 402 assumes that the Content-Disposition header to be "render".

The "Mime Type" subfield of "LUS Data" AVP is set to the Mime Type of User-to-User data. The MIME type is populated with the value in Content-Type header in the SIP message that triggers the CCR. The Content-Type header is defined in RFC 2045, and it is mandated by RFC3261 to be present if a message body is included.

The Content-type header includes media-type/subtype and optional parameters. One way to copy the value in the Content-Type header (in its entirety) is to populate the MIME-Type AVP. The "Direction" subfield of "UUS Data" AVP is set to 0 for UPLINK data or set to 1 for DOWNLINK of User-to-User data. This field indicated whether the UUS data travels in up-link or down-link direction. UP-LINK means UE originated traffic and DOWN-LINK means UE terminated traffic The "Cause Code" subfield of "Cause" AVP is set as per the following Tables for Successful Cause and Failure Cause:

|   | Successful Cause Type | Successful Cause Code |
|---|---|---|
| 1 | Normal End of Session | 0 |
| 2 | Successful Transaction | Do not used |
| 3 | End of SUSCRIBE dialog | Do not used |
| 4 | 3xx Redirection | 3xx |

|   | Failure Cause Type | Failure Cause Code |
|---|---|---|
| 1 | Unspecified error | 1 |
| 2 | 4xx Request failure | 4xx |
| 3 | 5xx Server failure | 5xx |
| 4 | 6xx Global failure | 6xx |
| 5 | Unsuccessful session setup | 2 |
| 6 | Internal error | 3 |

For a normal end of session, IMS gateway system 402 transmits a CCR[termination] with a cause code=0 (normal end of session). A Cause code=2 (Unsuccessful session setup) may be set for following scenarios. If IMS gateway system 402 receives a SIP CANCEL request prior to the 200 OK message, then IMS gateway system 402 transmits a CCR [termination] message. If IMS gateway system 402 receives a SIP BYE request prior to the ACK message, then IMS gateway system 402 generates a CCR[termination] message. If IMS gateway system 402 receives a SIP BYE after reception of the 200 OK final response, then a SIP ACK is not received.

Although specific embodiments were described herein, the scope of the invention is not limited to those specific embodiments. The scope of the invention is defined by the following claims and any equivalents thereof.

We claim:

1. An IMS gateway system for an IMS network, the IMS gateway system comprising:
   a session control interface adapted to exchange session control messages for an IMS session with a call session control function (CSCF) of the IMS network;
   a charging interface adapted to exchange charging messages with an online charging system (OCS) of the IMS network; and
   a control system adapted to wait for a session initiation message;
   responsive to receiving a session initiation message from a first subscriber through the session control interface to initiate a session with a second subscriber, the control system is adapted to transmit an initial credit control request message through the charging interface to the OCS to initiate a charging session for the first subscriber with the OCS, and wait for an initial credit control answer message from the OCS;
   responsive to receiving the initial credit control answer message from the OCS through the charging interface, the control system is adapted to transmit the session initiation message to the second subscriber through the session control interface, and wait for a session acceptance message from the second subscriber;
   responsive to receiving the session acceptance message from the second subscriber, the control system is further adapted to transmit the session acceptance message to the first subscriber through the session control interface, transmit an update credit control request message through the charging interface to the OCS to obtain a quota for the first subscriber for the session, and wait for an update credit control answer message from the OCS.

2. The IMS gateway system of claim 1 wherein:
   responsive to receiving the update credit control answer message from the OCS through the charging interface, the control system is further adapted to identify a quota granted by the OCS in the update credit control answer message, and provide budget control for the session based on the granted quota.

3. The IMS gateway system of claim 2 wherein:
   responsive to receiving a session termination message, the control system is further adapted to transmit a termination credit control request message through the charging interface to the OCS to report the used portion of the granted quota to the OCS, and wait for a termination credit control answer message from the OCS; and
   responsive to receiving the termination credit control answer message from the OCS through the charging interface, the control system is further adapted to terminate the session.

4. The IMS gateway system of claim 1 wherein the control system is further adapted to:
   set a timer responsive to transmitting the initial credit control request message to the OCS; and
   terminate the session responsive to the timer expiring.

5. The IMS gateway system of claim 1 wherein the control system is further adapted to:
   set a timer responsive to transmitting the update credit control request message to the OCS; and
   terminate the session responsive to the timer expiring.

6. The IMS gateway system of claim 1 wherein:
   if the initial credit control answer message from the OCS indicates that the session is toll free to the first subscriber, then the control system is adapted to provide toll free budget control for the session.

7. The IMS gateway system of claim 1 wherein the control system is further adapted to:
   identify session description parameters in the session initiation message from the first subscriber; and
   map the session description parameters in the session initiation message to parameters in the initial credit control request message.

8. The IMS gateway system of claim 1 wherein:
   the session control interface comprises an IMS service control (ISC) interface; and
   the charging interface comprises a Diameter Ro interface.

9. A method of operating an IMS gateway system for providing online charging in an IMS network, the IMS gateway system adapted to communicate with a call session control function (CSCF) for the session and an online charging system (OCS), the method comprising:
   waiting for a session initiation message to initiate a session between a first subscriber and a second subscriber;
   transmitting an initial credit control request message to the OCS to initiate a charging session for a first subscriber with the OCS responsive to receiving the session initiation message from the first subscriber;
receiving an initial credit control answer message from the OCS indicating an established charging session for the first subscriber;
transmitting an update credit control request message to the OCS to obtain a quota for the first subscriber for the session responsive to receiving a session acceptance message from the second subscriber;
receiving an update credit control answer message from the OCS;
identifying a quota granted by the OCS in the update credit control answer message; and
providing budget control for the session based on the granted quota.

10. The method of claim 9 further comprising:
transmitting a termination credit control request message to the OCS to report the used portion of the granted quota to the OCS responsive to receiving a session termination message;
receiving a termination credit control answer message from the OCS; and
terminating the session.

11. The method of claim 9 further comprising:
setting a timer responsive to transmitting the initial credit control request message to the OCS; and
terminating the session responsive to the timer expiring.

12. The method of claim 9 further comprising:
setting a timer responsive to transmitting the update credit control request message to the OCS; and
terminating the session responsive to the timer expiring.

13. The method of claim 9 wherein:
if the initial credit control answer message from the OCS indicates that the session is toll free to the first subscriber, then the method further comprises providing toll free budget control for the session.

14. The method of claim 9 further comprising:
identifying session description parameters in the session initiation message from the first subscriber; and
mapping the session description parameters in the session initiation message to parameters in the initial credit control request message.

15. An IMS gateway system for an IMS network, the IMS gateway system comprising:
a session control interface adapted to communicate with a call session control function (CSCF) of the IMS network;
a charging interface adapted to communicate with an online charging system (OCS) of the IMS network; and
a control system adapted to operate according to a state machine;
wherein the state machine includes an idle state where the control system is adapted to wait for a session initiation message to initiate a session;
wherein the state machine further includes a pending initial state where the control system, responsive to receiving a session initiation message from a first subscriber to initiate a session with a second subscriber, is further adapted to transmit an initial credit control request message to the OCS through the charging interface to initiate a charging session for the first subscriber with the OCS, and wait for an initial credit control answer message from the OCS;
wherein the state machine further includes a trying state where the control system, responsive to receiving an initial credit control answer message from the OCS, is further adapted to transmit the session initiation message through the session control interface to the second subscriber, and wait for a session acceptance message from the second subscriber;
wherein the state machine further includes a pending update state where the control system, responsive to receiving the session acceptance message from the second subscriber, is further adapted to transmit an update credit control request message through the charging interface to the OCS to obtain a quota for the first subscriber for the session, and wait for an update credit control answer message from the OCS.

16. The IMS gateway system of claim 15:
wherein the state machine further includes an in-session state where the control system, responsive to receiving the update credit control answer message from the OCS, is further adapted to identify a quota granted by the OCS in the update credit control answer message, and provide budget control for the session based on the granted quota.

17. The IMS gateway system of claim 16:
wherein the state machine further includes a pending termination state where the control system, responsive to receiving a session termination message, is further adapted to transmit a termination credit control request message through the charging interface to the OCS to report the used portion of the granted quota to the OCS, and wait for a termination credit control answer message from the OCS; and
responsive to receiving the termination credit control answer message from the OCS, the control system is further adapted to transition from the pending termination state to the idle state.

18. The IMS gateway system of claim 15:
wherein the state machine further includes a free session state where if the initial credit control answer message from the OCS indicates that the session is toll free to the first subscriber, then the control system is further adapted to provide toll free budget control for the session.

* * * * *

UNITED STATES PATENT AND TRADEMARK OFFICE
CERTIFICATE OF CORRECTION

PATENT NO.         : 8,139,735 B2                                      Page 1 of 1
APPLICATION NO.    : 11/563383
DATED              : March 20, 2012
INVENTOR(S)        : Cai et al.

It is certified that error appears in the above-identified patent and that said Letters Patent is hereby corrected as shown below:

In column 4, line 7, the text "over a linr 212" should read -- over a link 212 --

In column 4, lines 13-14, the text "function to perfonn" should read -- function to perform --

In column 14, line 30, the text "gateway system 402 receives a To expire" should read -- gateway system 402 receives a Tq expire --

In column 18, line 62, the text "subfield of "LUS" Data" should read -- subfield of "UUS" Data --

Signed and Sealed this
Fifteenth Day of May, 2012

David J. Kappos
*Director of the United States Patent and Trademark Office*